United States Patent
Lee et al.

(10) Patent No.: US 7,991,037 B2
(45) Date of Patent: Aug. 2, 2011

(54) MULTI-BEAM LASER APPARATUS

(75) Inventors: Chang Yun Lee, Gyunggi-do (KR); Bae Kyun Kim, Gyunggi-do (KR); Sang Su Hong, Gyunggi-do (KR); Tak Gyum Kim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 134 days.

(21) Appl. No.: 12/169,924

(22) Filed: Jul. 9, 2008

(65) Prior Publication Data

US 2009/0016400 A1 Jan. 15, 2009

(30) Foreign Application Priority Data

Jul. 10, 2007 (KR) .................. 10-2007-0068964

(51) Int. Cl.
*H01S 3/082* (2006.01)
(52) U.S. Cl. .................. 372/100; 372/101; 372/25
(58) Field of Classification Search .................. 372/100, 372/101, 25; 359/629
See application file for complete search history.

(56) References Cited

U.S. PATENT DOCUMENTS

| | | | | |
|---|---|---|---|---|
| 4,362,361 A * | 12/1982 | Campbell et al. | ............. | 359/629 |
| 5,071,225 A * | 12/1991 | Inoue | ............. | 359/634 |
| 5,534,950 A * | 7/1996 | Hargis et al. | ............. | 348/758 |
| 5,786,560 A | 7/1998 | Tatah et al. | | |
| 6,028,706 A * | 2/2000 | Shirasaki et al. | ............. | 359/577 |
| 6,147,806 A | 11/2000 | Park et al. | | |
| 7,154,673 B2 | 12/2006 | Tsukihara et al. | | |
| 2003/0189757 A1 | 10/2003 | Spiecker | | |
| 2004/0200815 A1 | 10/2004 | Lizotte et al. | | |
| 2004/0257664 A1 | 12/2004 | Hashimoto et al. | | |
| 2007/0151963 A1 * | 7/2007 | Tanaka et al. | ............. | 219/121.78 |

FOREIGN PATENT DOCUMENTS

| | | |
|---|---|---|
| DE | 195 35 525 A1 | 3/1997 |
| DE | 198 30 198 A1 | 2/1999 |
| DE | 102 15 162 A1 | 10/2003 |
| JP | 2003-207732 | 7/2003 |
| KR | 10-0849820 B1 | 7/2008 |
| KR | 10-0862448 B1 | 10/2008 |

OTHER PUBLICATIONS

Korean Office Action, issued in Korean Patent Application No. KR 10-2007-0068964, mailed Mar. 10, 2008.
German Office Action, with its English translation issued in German Patent Application No. 10 2008 031 937.6, dated Aug. 2, 2010.

* cited by examiner

*Primary Examiner* — Jessica T Stultz
*Assistant Examiner* — Kinam Park
(74) *Attorney, Agent, or Firm* — McDermott Will & Emery LLP

(57) ABSTRACT

There is provided a multi-beam laser apparatus including: a laser beam source generating a beam; an incident lens disposed on a path of the beam; a beam splitter splitting the beam incident on the incident lens into a plurality of beamlets; and a beam path adjustor disposed on each of paths of the split beamlets to change the respective paths of the split beamlets. The multi-beam laser apparatus easily produces a plurality of beamlets and adjusts paths of the beamlets obtained by a prism to improve machinability quality and uniformity.

9 Claims, 6 Drawing Sheets

MULTI-BEAM LASER APPARATUS

CROSS-REFERENCE TO RELATED APPLICATIONS

This application claims the priority of Korean Patent Application No. 2007-0068964 filed on Jul. 10, 2007, in the Korean Intellectual Property Office, the disclosure of which is incorporated herein by reference.

BACKGROUND OF THE INVENTION

1. Field of the Invention

The present invention relates to a multi-beam laser apparatus, and more particularly, to a multi-beam laser apparatus capable of easily producing a plurality of beamlets, and enhancing quality and uniformity in machining by adjusting paths of the beamlets obtained.

2. Description of the Related Art

Recently, in a thin film transistor for use in a liquid display, a poly silicon film with high carrier mobility is utilized for a channel layer. Generally, the poly silicon film of the thin film transistor is manufactured by forming an amorphous silicon film on a glass substrate and irradiating a laser beam onto the amorphous silicon film.

Here, to ensure higher efficiency of the process, the thin film transistor requires a beam splitter splitting a laser beam into a plurality of beamlets.

FIG. 1 shows a conventional beam splitter.

Referring to FIG. 1, in the beam splitter, a laser beam 11 generated from a light source passes through first and second beam splitting units 12a and 12b and is split into three beamlets. The beamlet passed through the second beam splitting unit 12b is reflected by a reflective mirror 13.

Accordingly, the laser beam 11 can be split into the three beamlets to be irradiated onto a workpiece such as a glass substrate. At this time, a collimator 14 such as a lens for focusing the three beamlets is disposed between the beam splitting units 12a and 12b and the workpiece 15.

The conventional beam splitter splits the one beam into the three beams to increase efficiency associated with e.g., laser annealing, however requiring the beam splitting units as many as the beamlets to be split. That is, as shown in FIG. 1, to split the one beam into the three beams, three optical units, i.e., two beam splitting units and one reflective mirror are necessary.

As a result, a greater number of the required beamlets complicate a structure of the optical system and pose a difficulty to precise control.

SUMMARY OF THE INVENTION

An aspect of the present invention provides a multi-beam laser apparatus capable of easily producing a plurality of beamlets, and enhancing quality and uniformity in machining by adjusting paths of the beamlets obtained.

According to an aspect of the present invention, there is provided a multi-beam laser apparatus including: a laser beam source generating a beam; an incident lens disposed on a path of the beam; a beam splitter splitting the beam incident on the incident lens into a plurality of beamlets; and a beam path adjustor disposed on each of paths of the split beamlets to change the respective paths of the split beamlets.

The beam path adjustor may be a prism.

The split beamlets may have a uniform intensity.

The beam splitter may include: first and second reflective mirrors having respective reflective surfaces formed in parallel to oppose each other; and a beam splitting unit disposed between the first and second reflective mirrors, the beam splitting unit splitting an incident beam into a transmitted beamlet and a reflected beamlet, wherein the beam generated from the laser light source is made incident to pass through the beam splitting unit at least twice by the first and second reflective mirrors and is outputted as the plurality of split beamlets.

The beam splitter may include a beam splitting unit splitting an incident beam into a transmitted beamlet and a reflected beamlet; and a reflective mirror disposed in parallel with the beam splitting unit and having the reflected beamlet made incident thereon, wherein the beam outputted from the laser light source is made incident to pass through the beam splitting unit at least twice by the reflective mirror and outputted as the plurality of split beamlets, and the beam splitting unit has a plurality of areas on which the beamlet reflected from the reflective mirror is incident and adjacent ones of the plurality of areas differ in light transmissivity from each other.

The plurality of beamlets passed through the beam path adjustor may propagate at an identical distance from the laser light source, respectively.

The multi-beam laser apparatus may further include a relay lens adjusting size and spacing of the plurality of beamlets passed through the beam path adjustor.

The relay lens may include first and second relay lenses disposed adjacent to each other.

A propagation distance of each of the beamlets from the incident lens to the first relay lens may be equal to a total sum of a focal length of the first relay lens and a focal length of the incident lens.

The beam generated from the laser light source may be a femtosecond laser beam to ensure efficiency in machining.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
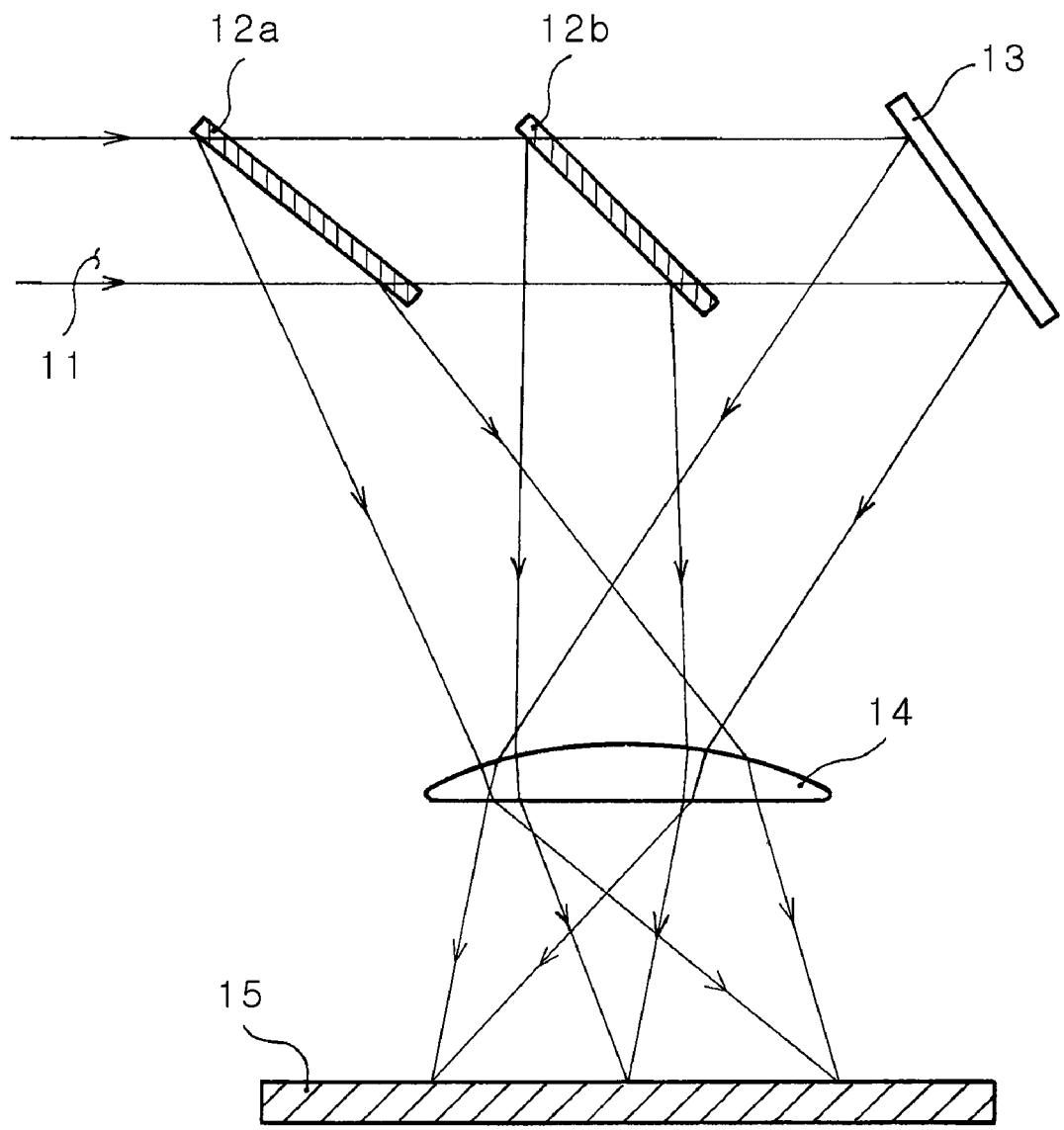
FIG. 1 is a schematic view illustrating a conventional beam splitter.

Exemplary embodiments of the present invention will now be described in detail with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference signs are used to designate the same or similar components throughout.

Figure 2:
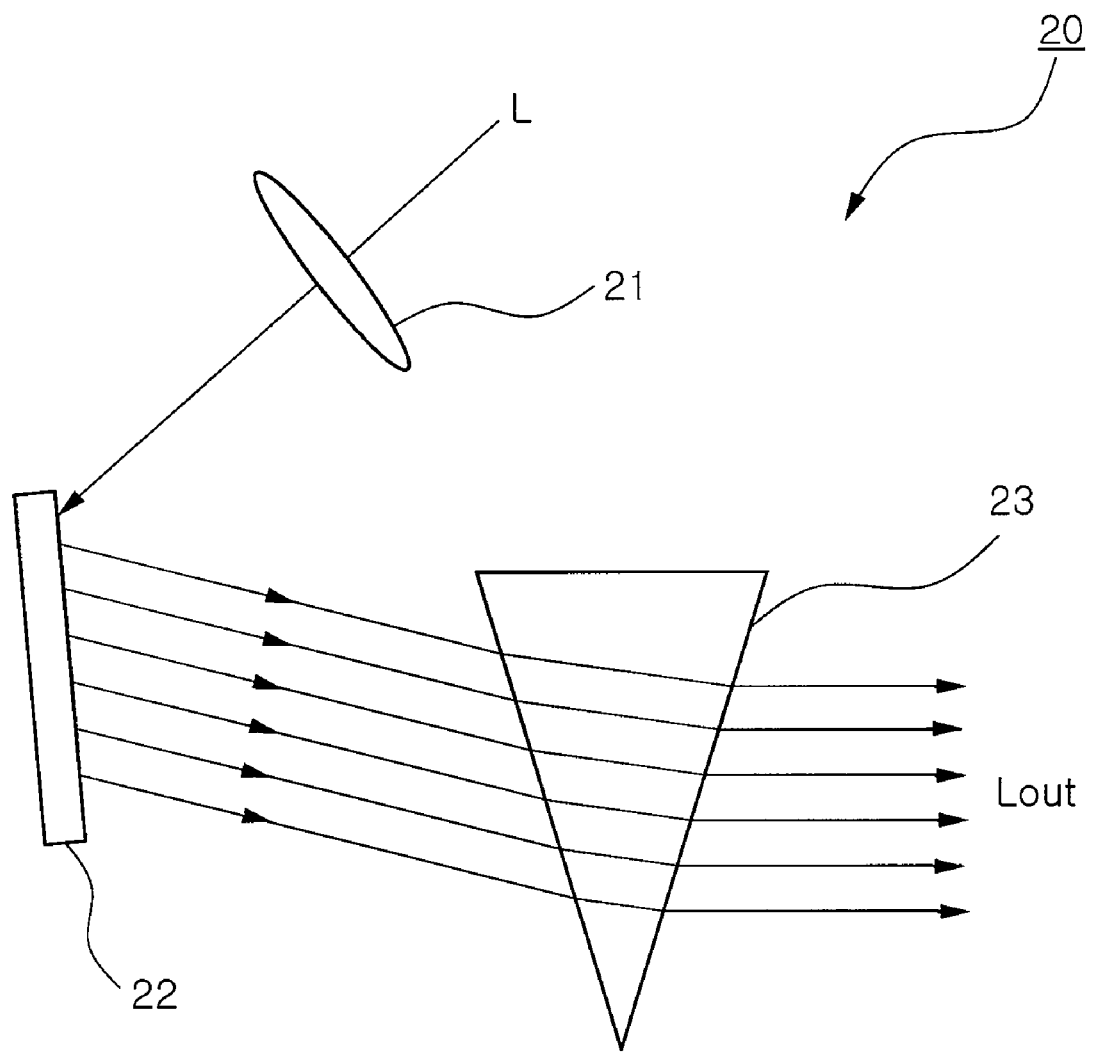
FIG. 2 is a schematic view illustrating a multi-beam laser apparatus according to an exemplary embodiment of the invention.

FIG. 2 is a schematic view illustrating a multi-beam laser apparatus according to an exemplary embodiment of the invention.

The multi-beam laser apparatus 20 of the present embodiment includes a laser light source generating a beam L, an incident lens 21, a beam splitter 22 and a prism 23. Here, configuration of the beam splitter 22 is not illustrated in detail and will be described later.

The laser beam L generated from the light source first passes through the incident lens 21 to be focused. For convenience's sake, in FIG. 2, the beam L is denoted with a solid line and not shown to be focused, which, however, will be described in FIG. 6.

The beam L passed through the incident lens 21 is incident on the beam splitter 22 and outputted as a plurality of split beamlets.

The beam splitter 22 may adopt any configuration as long as it allows the one incident beam L to be split into the plurality of beamlets.

Figure 3:
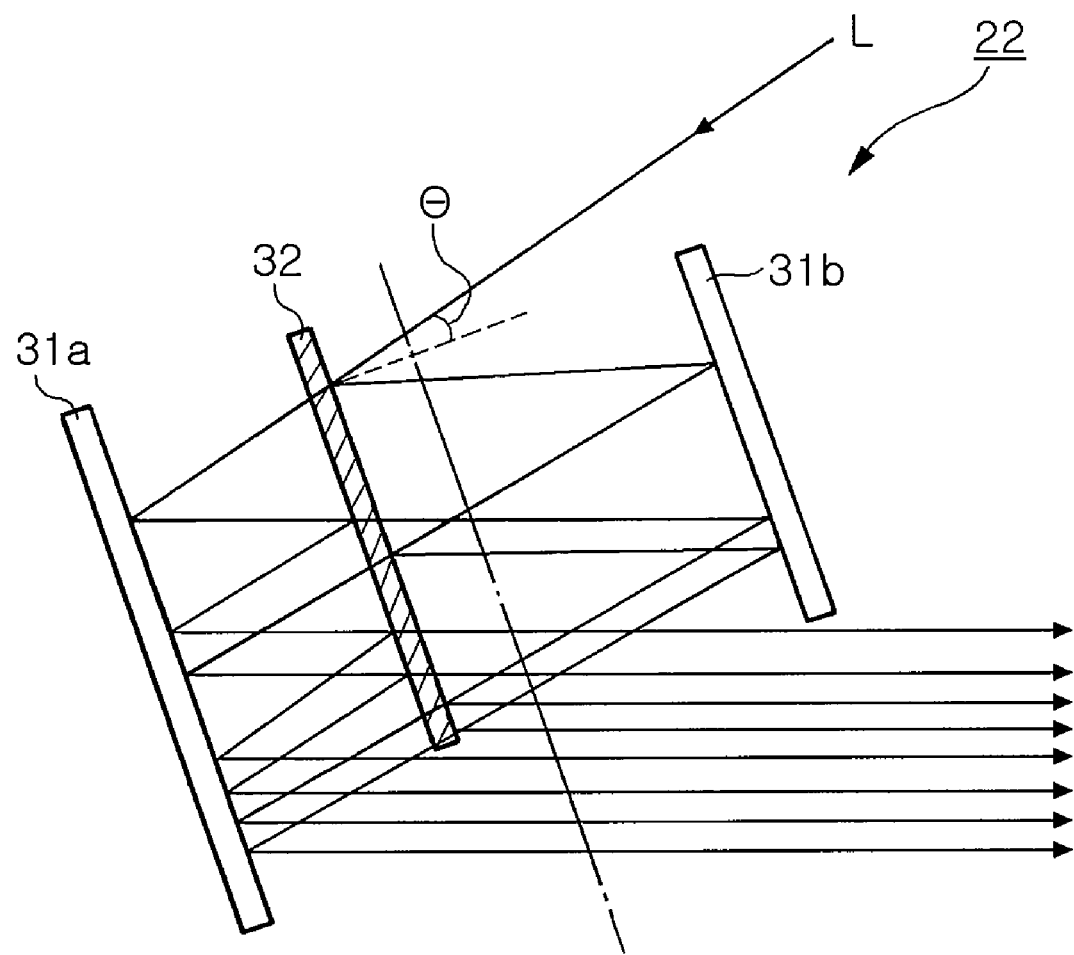
FIG. 3 is a schematic view illustrating a beam splitter according to an exemplary embodiment of the invention.

The beam splitter 22 of the present embodiment may be structured such that a beam splitting unit 32 is disposed between two reflective mirrors 31a and 31b. This structure corresponds to a multi-beam laser apparatus disclosed in Korean Patent Application No. 10-2007-0035514 which was previously filed by the same applicant of the present invention. This multi-beam laser apparatus is shown in FIG. 3. As suggested in the prior application, a beam splitter 22 splits the beam under the following principle.

First, a beam L generated from a laser light source is incident on a beam splitting unit 32 at a predetermined incident angle (θ). Here, a portion of the incident beam is transmitted through the beam splitting unit 32 to be guided to a first reflective mirror 31a. Meanwhile, the other untransmitted portion of the incident beam is reflected by the beam splitting unit 32 to be guided to a second reflective mirror 31b. At this time, the beam L of the beam splitting unit 32 can be adequately adjusted in light transmissivity and light reflectivity. However, to ensure maximum uniformity of the output beams, a ratio between the light transmissivity and the light reflectivity may be 1:1. That is, the beam splitting unit 32 may have a light transmissivity of 50%.

Meanwhile, the beam steered to the first reflective mirror 31a is reflected by the first reflective mirror 31a and propagates back to the beam splitting unit 32, and again undergoes processes of transmission and reflection by the beam splitting unit 32. That is, a portion of the beam reflected by the reflective mirror 31a is transmitted through the beam splitting unit 32 to be guided to the second reflective mirror 31b. Also, the other portion of the beam, i.e., beam reflected by the beam splitting unit 32 propagates back to the first reflective mirror 31a. In addition, the beam reflected initially by the beam splitting unit 32 also undergoes processes of reflection and splitting. Through repetitive processes of reflection and transmission, the laser beam L can be split into and output as a plurality of beamlets. That is, the beam is split into two beamlets whenever passing through the beam splitting unit 32, and a greater number of the split beamlets are produced when traveling reciprocally between the first and second reflective mirrors 31a and 31b.

As described above, the beam L is made incident to pass through the beam splitting unit 32 at least twice by the first and second reflective mirrors 31a and 31b and outputted as the plurality of split beamlets. Some details of the beam splitter 22 are omitted in this specification, but can be substituted by corresponding contents of Korean Patent Application No. 10-2007-0035514.

Figure 4A:
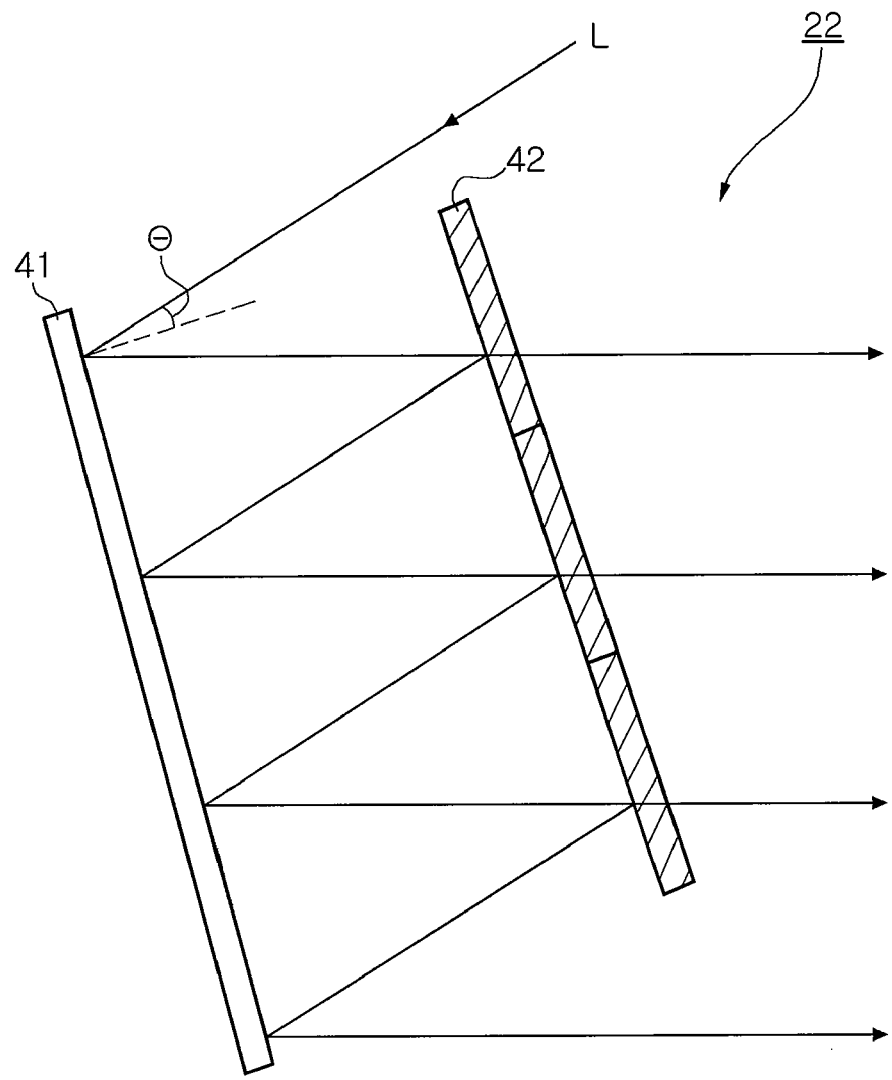
FIG. 4 is a schematic view illustrating a beam splitter according to another exemplary embodiment of the invention.
Figure 4B:
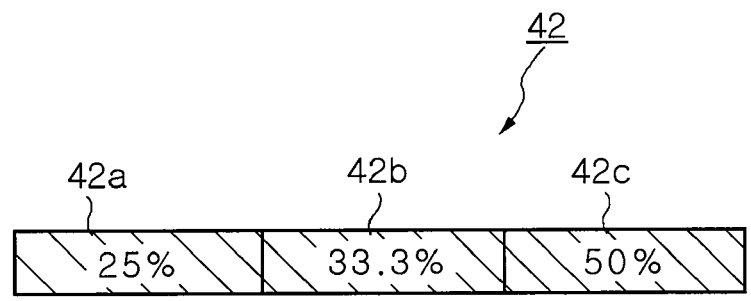

FIGS. 4A and 4B illustrate a structure of a beam splitter 22 according to another exemplary embodiment of the invention.

The beam splitter 22 of the present embodiment corresponds to a multi-beam laser apparatus disclosed in Korean Patent Application No. 10-2007-0035515 previously filed by the same applicant of the present invention.

First, the beam splitter 22 shown in FIG. 4A includes a reflective mirror 41 and a beam splitting unit 42 having patterned areas with different light transmissivity from one another. Here, the reflective mirror 41 and the beam splitting unit 42 may be disposed in parallel with each other to ensure uniform machinability.

A beam is split by the beam splitter 22 and outputted as a plurality of beamlets.

First, the laser beam L generated from a light source is incident on a reflective mirror 41 at a predetermined incident angle (θ), and reflected at an equivalent reflection angle. Thereafter, the reflected beam is guided to and incident on the beam splitting unit 42, and split into a transmitted beamlet and a reflected beamlet by the beam splitting unit 42. Here, the transmitted beamlet is outputted outward and the reflected beamlet propagates back to the reflective mirror 41.

That is, the incident beam L is made incident to pass through the beam splitting unit 42 at least twice by the reflective mirror 41 and outputted as the plurality of split beamlets.

The beam splitting unit 42 has a plurality of areas on which the beam incident from the reflective mirror 41 is made incident. Adjacent ones of the plurality of areas differ in light transmissivity from each other. Particularly, the beam splitting unit 42 may have light transmissivity adequately adjusted according to respective areas to ensure the beamlets to be outputted outward with identical intensity.

Adjustment of light transmissivity of the beam splitting unit 42 will be described with reference to FIG. 4B. The beam splitting unit 42 has a plurality of laser beam incident areas 42a, 42b and 42c defined in a length direction on a cross-sectional basis. Adjacent ones of the plurality of incident areas differ in light transmissivity from each other. Here, the length direction is understood as a direction in which the laser beam propagates to pass through the reflective mirror 41 and the beam splitting unit 42 and be outputted outward. In the beam splitting unit 42 of FIG. 4B, the length direction is a direction from the left side to the right side.

Meanwhile, as shown in FIG. 4B, to assure the split beamlets to be outputted with identical intensity, the laser beam incident areas 42a, 42b, and 42c have light transmissivity of 25%, 33.3%, and 50%, respectively.

Therefore, a portion of the primarily incident beam on the beam splitting unit 42 is transmitted at an intensity of 25% with respect to an intensity of the primarily incident laser beam L. Accordingly, the other portion of the incident beam is reflected by the beam splitting unit 42, incident again on the reflective mirror 41 and then reflected at an intensity of 75%. When the beam with an intensity of 75% is incident on the second incident area 42b of the beam splitting unit 42, the beam is transmitted at an intensity of 33.3% of 75%, i.e., 25% and outputted outward. In the same manner, the beam is reflected in the incident area 42b at an intensity of 50%, i.e., 25% subtracted from 75%. The beam is reflected again by the reflective mirror 41 to be incident on the third incident area 42c of the beam splitting unit.

Some details of the beam splitter 22 are omitted in this specification but can be substituted by corresponding contents of Korean Patent Application No. 10-2007-0035515.

Referring to FIG. 2, paths of beamlets will be described hereinafter. The beamlets split by the beam splitter 22 are altered in respective paths when passing through the prism 23.

The beamlets split when passing through the beam splitter 22 may differ in paths from one another and accordingly be focused at different positions by the incident lens 21. In a case where the beams differ in focusing position from one another, the substrate may be machined with poor uniformity.

To overcome this problem, the prism 23 acts as a beam path adjustor for ensuring the plurality of split beamlets to be identical in optical paths thereof to one another.

That is, the prism 23 allows the beamlets Lout passed therethrough to propagate from the laser light source at a substantially identical distance to one another. Particularly, out of the beamlets outputted from the beam splitter 22, the beamlet with a relatively shorter path propagates along a long path in the prism 23. On the other hand, the beamlet with a relatively longer path propagates along a short path in the prism 23.

To this end, the prism 23 may be adequately varied in position, angle, shape and material thereof. That is, this allows a focal point of each of the beamlets to be positioned on a surface perpendicular to the path of the beamlet. This will be described in further detail with reference to FIG. 6. Meanwhile, in the present embodiment, the prism is employed as the beam path adjustor, but the present invention is not limited thereto. Alternatively, other device may be utilized as the beam path adjustor to allow the plurality of beamlets to be identical in respective paths thereof.

Figure 5:
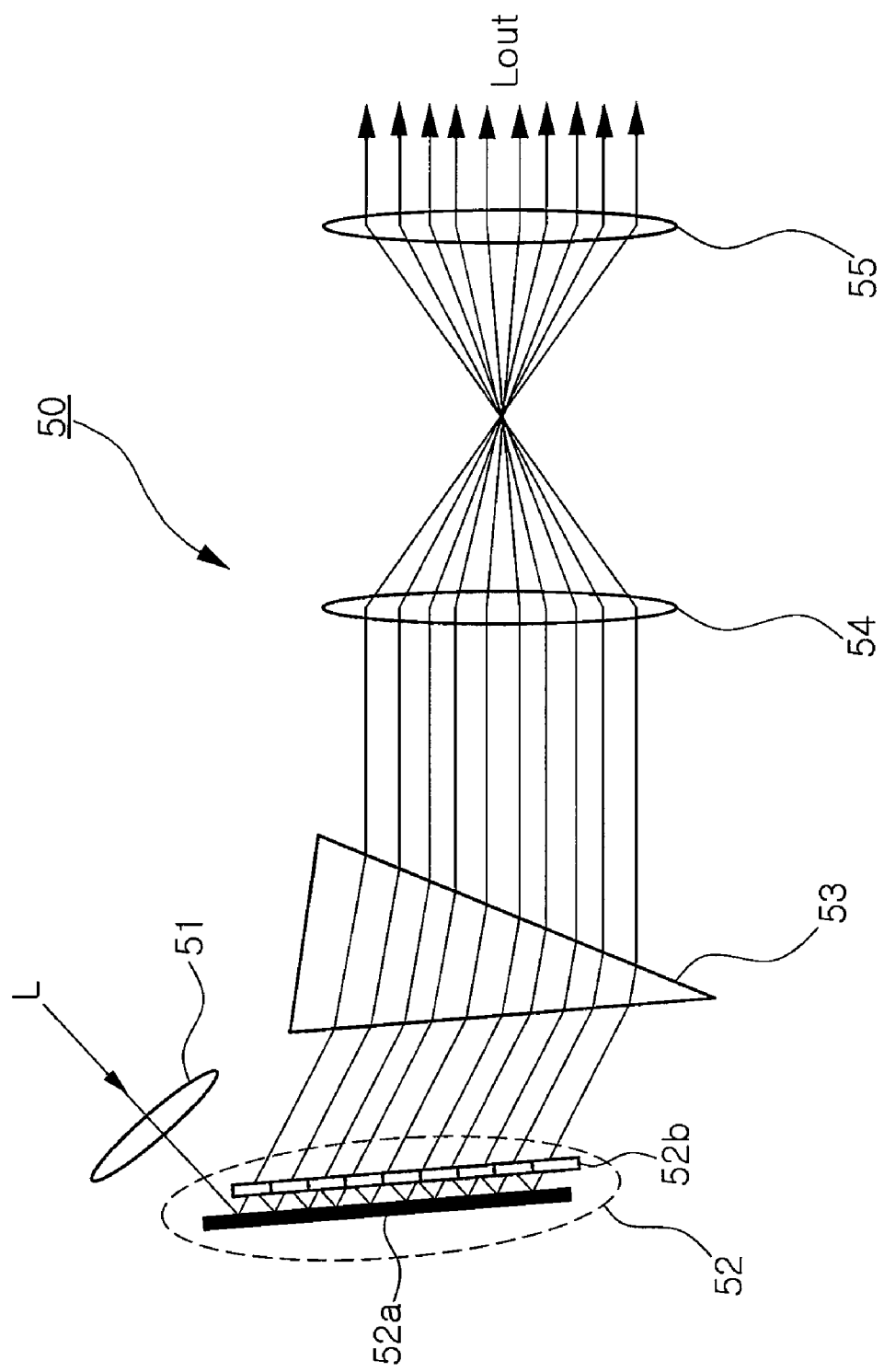
FIG. 5 is a schematic view illustrating a multi-beam laser apparatus according to still another exemplary embodiment of the invention.

FIG. 5 is a schematic view illustrating a multi-beam laser apparatus according to still another exemplary embodiment of the invention.

In the same manner as FIG. 2, the multi-beam laser apparatus 50 of the present embodiment includes a laser light source generating a beam L, an incident lens 51, a beam splitter 52 and a prism 53. The multi-beam laser apparatus 50 further includes first and second relay lenses 54 and 55.

The incident lens 51 and the prism 53 are construed to be identical to those shown in FIG. 2. The beam splitter 52 is similar to that of FIG. 4A, and includes a reflective mirror 52a and a beam splitting unit 52b having patterned areas with different light transmissivity from one another. However, unlike FIG. 4A, the beam splitter 52 includes nine areas defined by different light transmissivity from one another, thus outputting a greater number of beamlets. This can be optionally obtained by adjusting light transmissivity pattern of the beam splitting unit 52b.

The plurality of beamlets whose paths are adjusted by the prism 53 pass through the first and second relay lenses 54 and 55 to be outputted outward.

In the present embodiment, the first and second relay lenses 54 and 55 serve to adjust size and spacing of the split beamlets. The plurality of output beamlets Lout whose size and spacing are adjusted by the first and second relay lenses 54 and 55 can be used for e.g., machining a substrate.

Now, referring to FIG. 6, a principle of machining the substrate by adjusting focal points of the split beamlets will be described.

Figure 6:
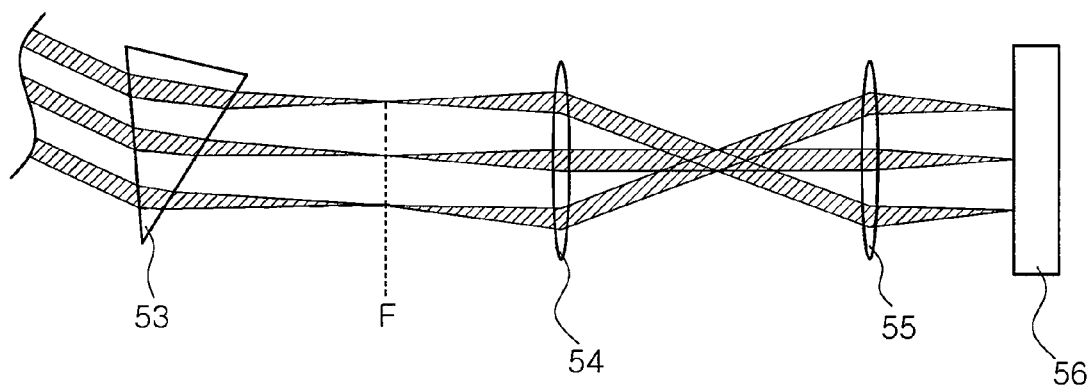
FIG. 6 illustrates more detailed paths of split beamlets in the embodiment of FIG. 5.

FIG. 6 illustrates detailed paths of the split beamlets shown in FIG. 5. For convenience's sake, only three beamlets are illustrated, and paths of the beamlets before being split by the beam splitter are not shown.

Referring to FIG. 6, the plurality of split beamlets passing through the incident lens and the beam splitter can be identical in respective focal points F by virtue of the prism 53. The beamlets focused on the focal point F are diverged when propagating toward the first relay lens 54. Here, the first relay lens 54 may be disposed at a distance equivalent to a focal length from the focal points F.

The plurality of beamlets passing through the first relay lens 54 are focused by the second relay lens 55 and irradiated on a surface of the substrate 56 which is to be machined. As described above, the first and second relay lenses 54 and 55 can be properly selected in terms of arrangement and lens characteristics to adequately adjust size and spacing of the beamlets irradiated on the substrate 56 which is to be machined.

Meanwhile, when the split beamlets are utilized for machining, the laser beam L may be that of a femtosecond laser. This accordingly enhances efficiency in machining e.g., a transparent substrate. The femtosecond laser is a pulse type laser and has a pulse radiation time of $10^{-15}$ seconds. This femtosecond laser oscillates at an ultra short pulse time, thus ensuring energy oscillation at a high density. When the femtosecond laser generally has an optical energy of 1 mJ and a pulse radiation time of 100 femtoseconds or less, the laser beam can have an energy density of about 10 gigawats to enable a material of any type to be machined. Moreover, when this ultra short pulse laser beam is irradiated on a workpiece to be machined, the workpiece can be machined with minimum heat diffusion. This is because an incident pulse is shorter than the time when photons transfer heat to a lattice of a material, while multi-photon phenomenon occurs in the lattice to cause atomic excitation. This consequently prevents deterioration of precision in machining resulting from heat diffusion when the workpiece is machined. Furthermore, this prevents the material from being altered physically and chemically and a machined portion of the workpiece from being partially fused, thereby assuring high-precision machinability.

However, machining via this femtosecond laser beam entails disadvantages which hinder commercialization. That is, the femtolaser' low repetition rate prolongs a machining time and considerably degrades a machining speed over a case where the conventional nanosecond laser or $CO_2$ laser is employed. The nanosecond laser used for machining has a repetition rate of several to tens of MHz, and a titanium sapphire laser for general use in femtosecond laser machining has a repetition rate of 1 KHz. Thus, the femtosecond laser is slower in machining by $10^4$ times.

Therefore, when the femtosecond laser beam is employed in the beam splitter of the present embodiment, a desired number of split beamlets can be easily output, thereby enhancing a laser machining rate dramatically.

As set forth above, according to exemplary embodiments of the invention, a multi-beam laser apparatus easily produces a plurality of beamlets, and enhances quality and uniformity in machining by adjusting paths of the beamlets obtained.

While the present invention has been shown and described in connection with the exemplary embodiments, it will be apparent to those skilled in the art that modifications and variations can be made without departing from the spirit and scope of the invention as defined by the appended claims.

What is claimed is:

1. A multi-beam laser apparatus comprising:
 a laser beam source generating a beam;
 an incident lens disposed on a path of the beam;
 a beam splitter splitting the beam incident on the incident lens into a plurality of beamlets; and
 a beam path adjustor disposed on each of paths of the split beamlets to change the respective paths of the split beamlets, the beam path adjustor configured for adjusting the plurality of the beamlets from the laser light source to be substantially identical in path length, wherein the beam splitter comprises a beam splitting unit which has a plurality of areas and adjacent areas within the plurality of areas comprising different materials differing in light transmissivity from each other.

2. The multi-beam laser apparatus of claim 1, wherein the beam path adjustor is a prism.

3. The multi-beam laser apparatus of claim 1, wherein the split beamlets have a uniform intensity.

4. The multi-beam laser apparatus of claim 1, wherein the beam splitter comprises:

first and second reflective minors having respective reflective surfaces formed in parallel to oppose each other; and a beam splitting unit disposed between the first and second reflective minors, the beam splitting unit splitting an incident beam into a transmitted beamlet and a reflected beamlet, wherein the beam generated from the laser light source is made incident to pass through the beam splitting unit at least twice by the first and second reflective minors and is outputted as the plurality of split beamlets.

5. The multi-beam laser apparatus of claim 1, wherein the beam splitter comprises a beam splitting unit splitting an incident beam into a transmitted beamlet and a reflected beamlet; and a reflective minor disposed in parallel with the beam splitting unit and having the reflected beamlet made incident thereon, wherein the beam outputted from the laser light source is made incident to pass through the beam splitting unit at least twice by the reflective mirror and outputted as the plurality of split beamlets, and the beam splitting unit has a plurality of areas on which the beamlet reflected from the reflective minor is incident.

6. The multi-beam laser apparatus of claim 1, further comprising a relay lens adjusting size and spacing of the plurality of beamlets passed through the beam path adjustor.

7. The multi-beam laser apparatus of claim 6, wherein the relay lens comprises first and second relay lenses disposed adjacent to each other.

8. The multi-beam laser apparatus of claim 7, wherein a propagation distance of each of the beamlets from the incident lens to the first relay lens is equal to a total sum of a focal length of the first relay lens and a focal length of the incident lens.

9. The multi-beam laser apparatus of claim 1, wherein the beam generated from the laser light source is a femtosecond laser beam.

* * * * *